United States Patent [19]

DeMarco

[11] Patent Number: 4,820,315
[45] Date of Patent: Apr. 11, 1989

[54] VACUUM LOADER AND PROCESS FOR REMOVING ASBESTOS AND OTHER PARTICULATE MATERIAL

[76] Inventor: Thomas M. DeMarco, 5815 N. Cicero, Chicago, Ill. 60646

[21] Appl. No.: 126,185

[22] Filed: Nov. 27, 1987

[51] Int. Cl.⁴ .............................................. B01D 45/12
[52] U.S. Cl. .......................................... 55/1; 55/337; 55/429
[58] Field of Search .................. 55/337, 429, DIG. 3, 55/1, 52

[56] References Cited

U.S. PATENT DOCUMENTS

| | | | |
|---|---|---|---|
| 4,133,658 | 1/1979 | Callewyn | 55/429 X |
| 4,223,748 | 9/1980 | Barendsen | 55/429 X |
| 4,224,043 | 9/1980 | Dupre | 55/429 X |
| 4,229,193 | 10/1980 | Miller | 55/DIG. 2 X |
| 4,715,872 | 12/1987 | Snyder | 55/429 X |
| 4,735,639 | 4/1988 | Johnstone | 55/429 X |

*Primary Examiner*—Charles Hart
*Attorney, Agent, or Firm*—Jeffrey M. Morris

[57] ABSTRACT

A unique vacuum loader and process is provided to efficiently remove, effectively collect, and safely dispose asbestos, hazardous material, and other particulate matter under continuous negative pressure during all phases of operation while preventing emissions of asbestos and other particulates to the atmosphere. In the preferred embodiment, the vacuum loader comprises a four stage, dual unit, machine with a trailerable separation and filtration unit to centrifugal separate, dedust, and filter dust laden fluid and a portable bagger unit to safely discharge the removed asbestos or other material into bags or other containers.

19 Claims, 4 Drawing Sheets

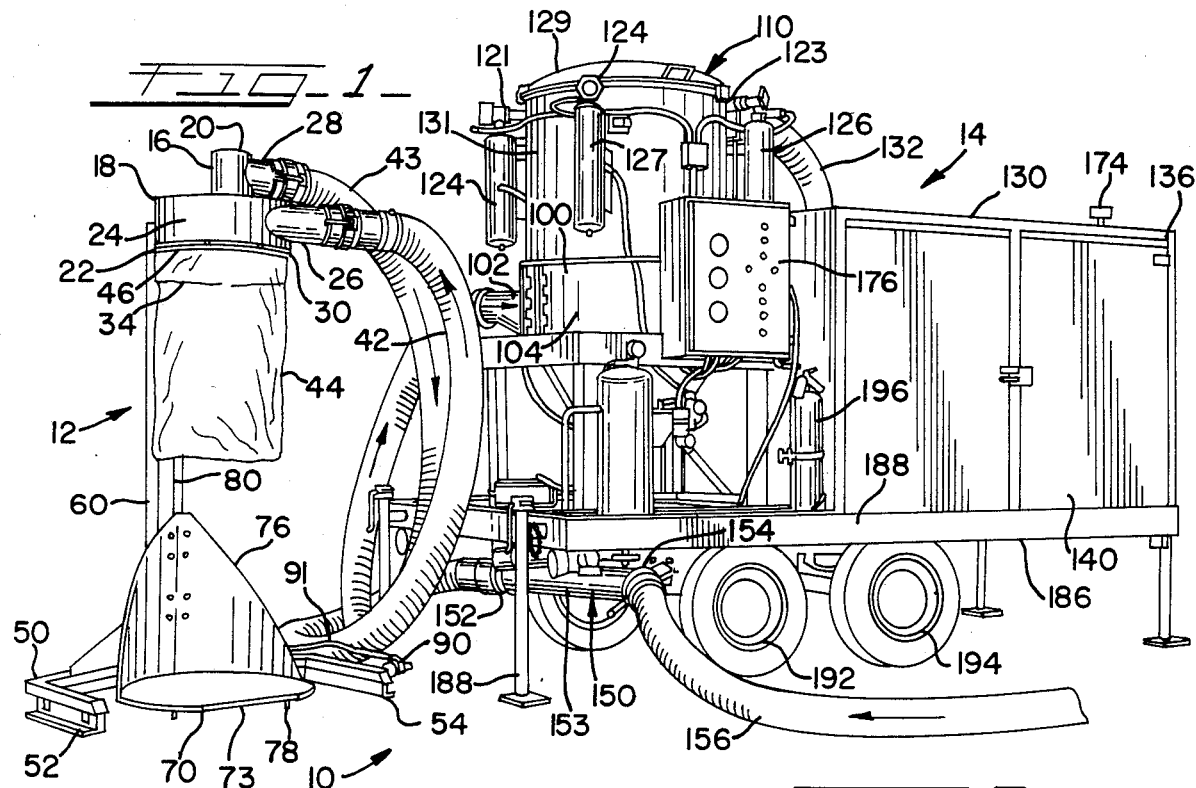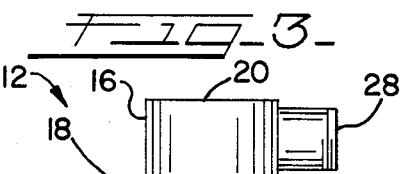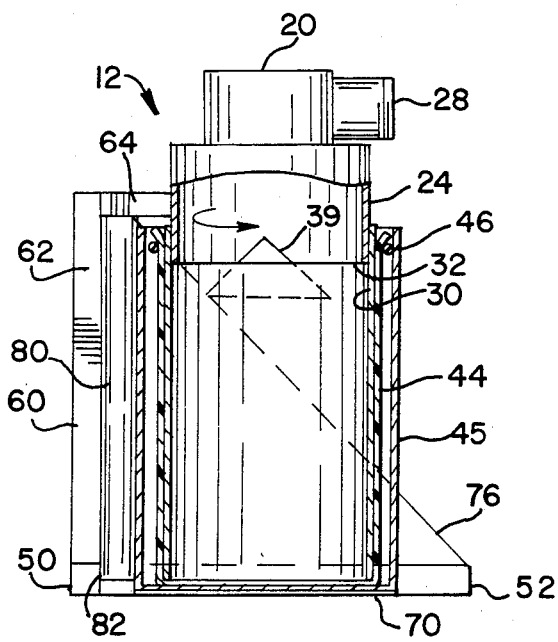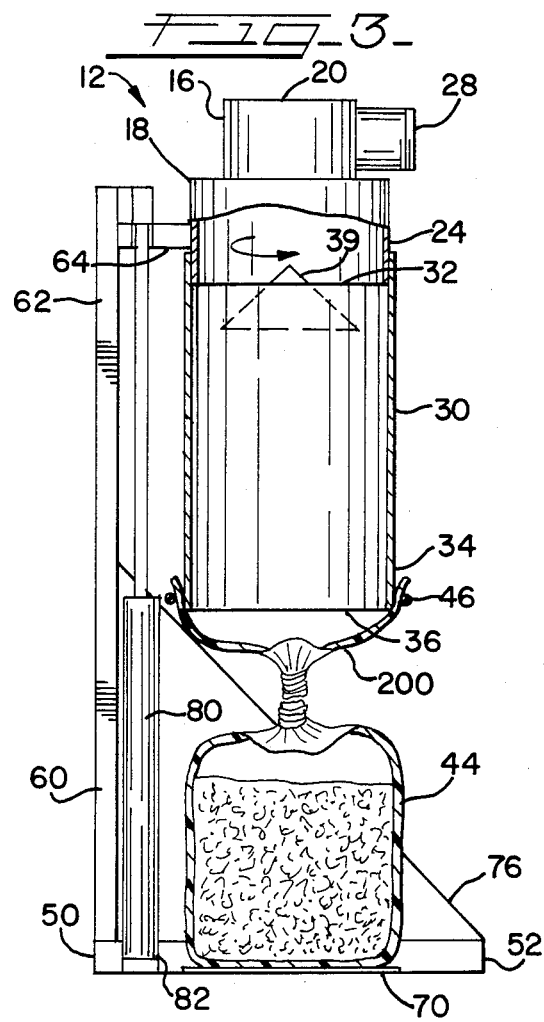

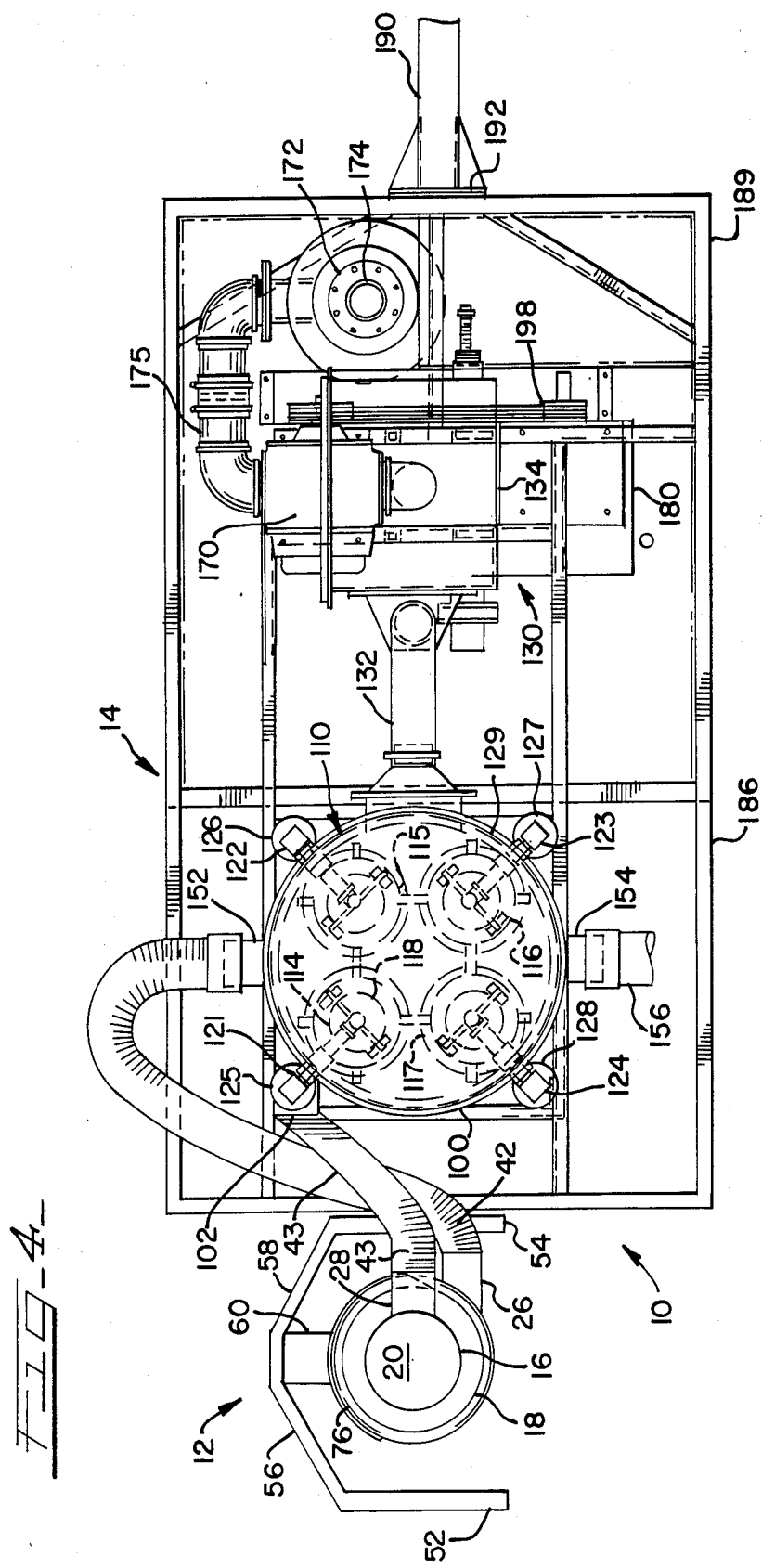

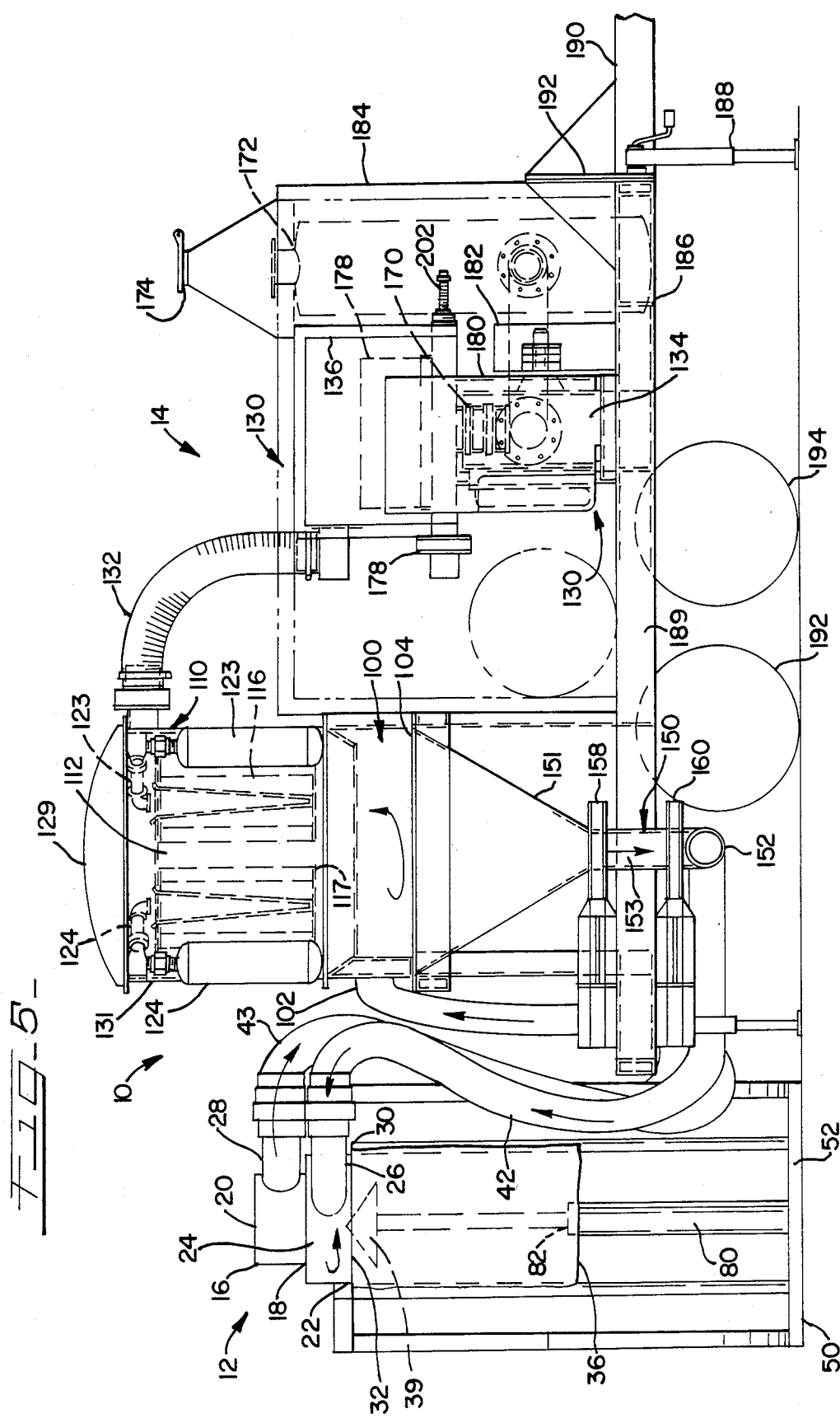

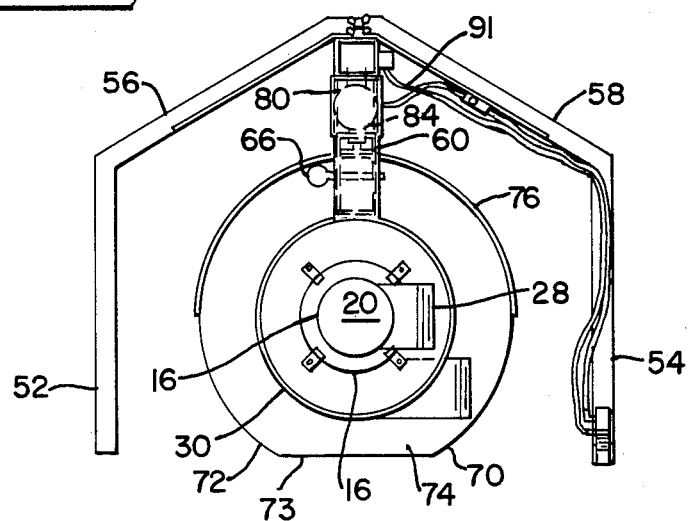
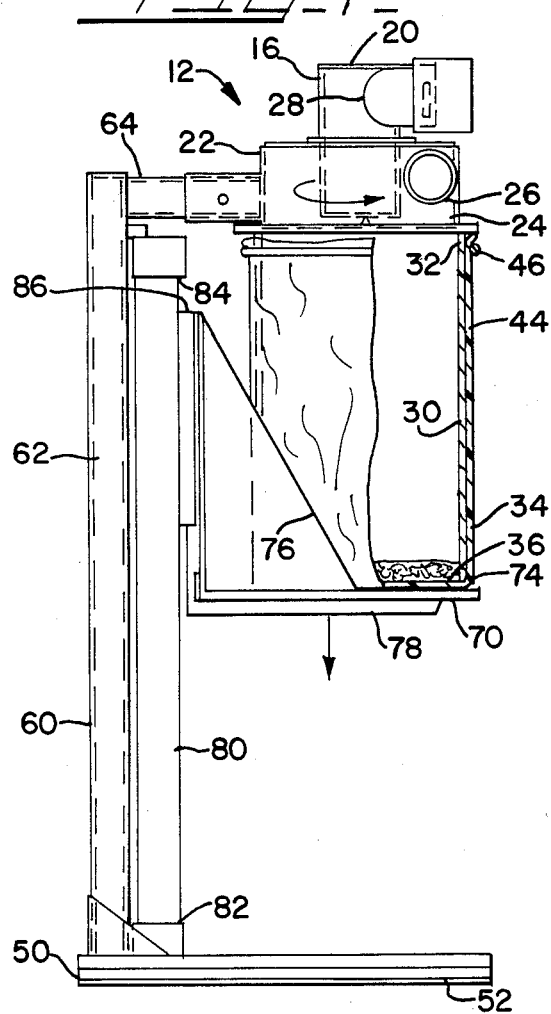
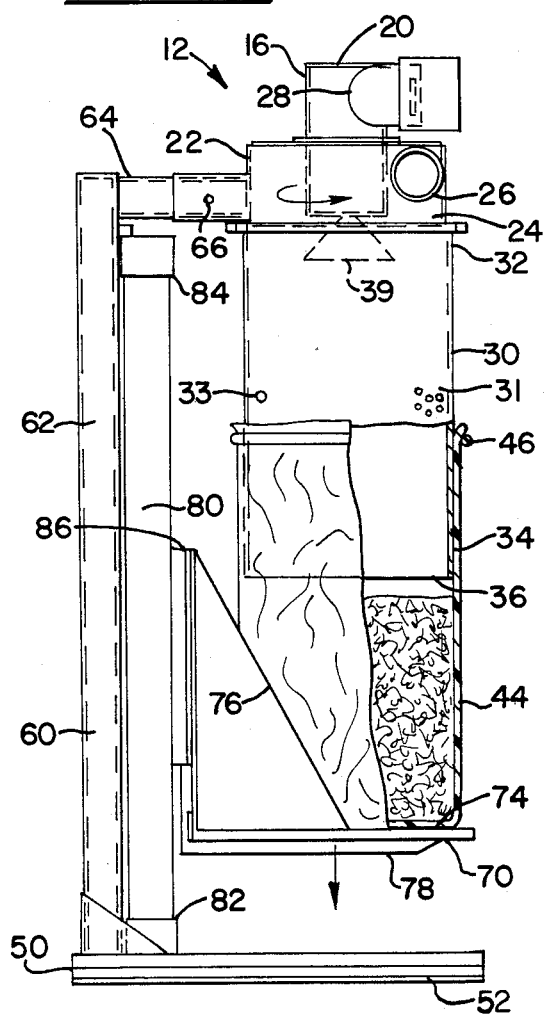

VACUUM LOADER AND PROCESS FOR REMOVING ASBESTOS AND OTHER PARTICULATE MATERIAL

BACKGROUND OF THE INVENTION

This invention pertains to machines and processes for removing dry and wet liquid particulates, and more particularly, to a vacuum cleaner loader and process for removing asbestos and other particulate material.

Government studies and numerous health reports have linked exposure to asbestos fibers with serious diseases including asbestoses, fibrosis, and lung cancer. Asbestoses has also been thought to cause or aggravate other maladies, such as emphysema, tuberculosis, bronchitis, asthma, pneumonia, inflammations, and infections. Many people who worked in asbestos manufacturing plants or who were employed installing asbestos insulation, have developed cancer and died.

For many decades, asbestos was commonly used as an insulator for houses, schools, factories, and public buildings. Asbestos fibers are readily circulated in the air and are dangerous if inhaled. The presence of asbestos in insulation in buildings can be harmful and injurious to the health, safety, and well being of children and adults alike.

Contamination of buildings with asbestos insulation can be cured by removing the asbestos. Asbestos removal, however, is not easy. Various industrial vacuum cleaners, loaders, and collectors have been tried but have not been very effective. Furthermore, collection, and disposal of asbestos with conventional prior art equipment often exposes the operator and surrounding personnel to concentrated amounts of the collected asbestos, which can be dangerous, harmful, and even fatal.

Also, in industry, voluminous amounts of particulate matter, debris, dust, waste, and other hazardous material are emitted during machining, foundry, milling, shipment, warehousing, assembling, fabricating, and other manufacturing operations. Particulates of hazardous material emitted during a manufacturing operation can include metal slivers, plastic chips, wood shavings, dirt, sand, and other debris. Particulates accumulate on floors, machines, packaging materials, equipment, and personnel. Particulates of hazardous material can also be carried and circulated in the air and can be harmful, if breathed, swallowed, or stuck in an eye. Particulates of hazardous material can damage, erode, and adversely effect the efficiency and operability of equipment. Hazardous material can also pollute the atmosphere. It may also impair the quality of the products manufactured.

Asbestos emissions and emissions of other hazardous material are not only dangerous and troublesome, but are particularly aggravating and grievous in schools, houses, public buildings, and where relatively dust-free conditions and sterile environments are required, such as in food processing plants and medical supply houses.

Over the years a variety of vacuum cleaners, industrial dust collectors, and other equipment have been suggested for removing industrial dust and debris and for other purposes. Typifying these vacuum cleaners, industrial dust collectors, and other equipment are those found in U.S. Pat. Nos. 485,915, 795,412, 2,276,805, 2,372,316, 2,467,503, 2,496,180, 2,604,956, 2,720,278, 3,320,727, 3,485,671, 3,541,631, 3,554,520, 3,577,705, 3,608,283, 3,650,420, 3,653,190, 3,717,901, 3,731,464, 3,751,881, 3,780,502, 3,842,461, 3,877,902, 3,951,623, 3,955,236, 3,961,655, 3,970,489, 3,999,653, 4,007,026, 4,010,784, 4,032,424, 4,036,614, 4,062,664, 4,099,937, 4,111,670, 4,174,206, 4,207,937, 4,224,043, 4,229,193, 4,272,254, 4,307,764, 4,443,235, 4,504,292, and 4,467,494. These prior art vacuum cleaners, industrial dust collectors, and other equipment have met with varying degrees of success.

It is, therefore, desirable to provide an improved vacuum loader and process which overcomes most, if not all, of the preceding problems.

SUMMARY OF THE INVENTION

An improved vacuum loader and process is provided to remove, collect, seal, and dispose asbestos, hazardous material, and other particulate matter without exposing surrounding personnel to the collected material. Advantageously, the vacuum loader is efficient, effective and safe. In the preferred form, the novel vacuum loader comprises a unique four stage industrial asbestos and particulate material collector with a separate bagger unit and a trailerable separation and filtration unit.

The novel vacuum loader has a first separator which is preferably in the form of a special bagger unit with a first cyclone to partially dedust and separate a substantial amount of particulates from a dusty fluid. The vacuum loader also has a second separator which is positioned downstream of the first separator. The second separator preferably has a second cyclone to further dedust and remove most of the remaining particulates from the partially dedusted fluid. Desirably, a reinjection compartment is positioned between the first and second separators to collect the particulates removed by the second separator and sequentially feed the removed particulates to the first separator via a hose or other conduit.

The novel vacuum loader has a special bulk separator with at least one cyclone to partially dedust, separate, and remove a substantial amount of asbestos and other material from a dust laden fluid. At least one and preferably two filtering compartments are positioned downstream and communicate with the bulk separator. The filtering compartments can contain filter canisters with tubular filters, Hepa-type filters or box-type filters. Other types of filters can also be used.

The removed asbestos and other material is dispensed in a container by a filling member of a vacuum operated bagger unit. The container can comprise one or more flexible bags, or a bag in a drum. Other types of containers such as barrels, bins, receptacles, and vessels can be used. The bags can be made of plastic, fabric, paper, rubber, woven metal, or other material.

In the preferred form, a first cyclone is positioned in an upper bulk separation chamber of the bagger unit, and a second cyclone is position in a second stage bulk separation compartment below a third stage filtration compartment and along side a fourth stage filtering compartment. The cyclones can comprise centrifugal or tangential cyclones. Air pulse injectors, vibrators, or mechanical shakers can be provided to clean the filters. A dual valve reinjection compartment can be positioned below the second stage bulk separation compartment to collect the removed asbestos and other material from the second stage bulk separation compartment and convey (recycle) the collected asbestos and other particulate material to the bagger unit.

Desirably, the direct bagger unit has a support platform or moveable platen to support a bag or other container. In the preferred form, the bagger unit also has at least one deflector to minimize backflow of the removed asbestos and other material. The deflector can comprise a triangular deflector, a conical baffle, a spiral baffle, a helical baffle, or an annular ring-like baffle. The filling member of the bagger unit can comprise a tubular vacuum cylinder with holes or apertures to relieve negative pressure.

In order to effectively remove asbestos, hazardous material, and other particulate matter, the container is positioned about the discharge opening of the bagger unit's filling member, which preferably comprises a tubular vacuum cylinder, and a platen is elevated against the container. Dusty influent fluid laden containing dust (asbestos, hazardous material, and/or other particulate matter) is drawn and sucked into the inlet of the bagger unit and the removed dust, which can be removed by the centrifugal cyclone, is dispensed through the filling member into a bag or other container under suction and negative pressure. Preferably, the bottom of the bag or other container is abuttingly engaged and supported by a moveable platen which is elevated to a position adjacent the discharge opening of the tubular vacuum cylinder during startup. Desirably, the bag is sealed and securely retained to the tubular vacuum cylinder by a retainer, such as an elastomeric band. After the bag is filled to a desired amount, the platen is lowered and the bag will slide downwardly under the weight of the collected material. Advantageously, the novel vacuum loader and process prevent asbestos or other hazardous material from contacting and contaminating the exterior of the bag and from being emitted to the atmosphere about the operator.

After a substantial amount of asbestos or other material has been dispensed into the bag, through the vacuum cylinder which is partially enclosed by the bag, dispensing is suspended, the platen is lowered, the substantially filled bag is turned, spun, and twisted, tied with a twist tie, clip, or heat sealed, and subsequently severed (cut) leaving a remnant about the vacuum cylinder. The severed bag is removed and transported for safe disposal. A new bag is slipped over the remnant and secured to the vacuum cylinder and the dispensing (fill) cycle is repeated.

In the preferred process, partially dusty fluid is discharged from the bagger unit and centrifugally separated in a cyclone of a trailerable separation and filtration unit. The centrifugally separated fluid can be partially filtered in a set of tubular filters and subsequently filtered in a Hepa-type filter. Asbestos and other particulate matter removed in the trailerable separation and filtration unit is preferably fed back to the bagger unit.

The direct bagger unit and the reinjection system provide new and unique material vacuuming equipment and methods that substantially prevent exposure and leakage of hazardous dust into the atmosphere, from the vacuuming hose inlet to the direct bagger unit, during the vacuuming of wet asbestos, asbestos contaminated soil/sand, wet/dry materials, and contaminated liquids. The total collection of vacuumed material directly into plastic bags, with or without a drum, as is achieved by the novel direct bagger unit is very desirable to minimize any possibility of personnel exposure to the asbestos and other vacuumed material. Additionally, the novel complete vacuuming system is under continuous negative pressure from the vacuuming hose inlet port to the vacuum producing pump inlet port during all vacuuming cycles which is a very desirable factor in eliminating the possibility of dust particle release into the atmosphere.

Preferably, the contaminated material is vacuum conveyed under negative pressure to the direct bagger unit, after passing through the reinjection system, which can be up to 1,000 feet away from the inlet port of the vacuuming hose when vacuuming wetted asbestos, or up to 500 feet away from the inlet port of the vacuuming hose when vacuuming contaminated dry soil. The vacuumed dusty material then enters the direct bagger unit which centrifugally separates out the bulk of the vacuumed material from the air stream for depositing directly into a steel, plastic, or fiber drum and/or a single, double, or more plastic bags. This unique method of dust free bag filling is made possible by a vacuum supporting cylinder which the plastic containment bags are slipped over and retained in place by a rubber band or other suitable type retainer placed around it by the operator. For ease of storage and convenience, the rubber retainer bands can be stored near the top of the vacuum cylinder. The operator can raise the rubber faced platen up to seal off the vacuum cylinder's full bottom orifice by depressing the raise side of the closed-center foot operated valve, which is located adjacent to the bagger support base, resulting in a tight (about 100%) vacuum seal for vacuum collection of material. Additionally, a steel, plastic, or fiber drum, such as a 55 gallon drum, can be placed under the plastic bag that is covering the vacuum cylinder for further containment and support.

A safety foot valve is provided to raise and lower the lift platen. Desirably, the safety foot valve frees the operator's hands for additional operational functions. Also, with the closed-center foot valve feature, the operator can stop the platen at any desired height when lowering it away from the vacuum cylinder. The desired platen height will vary with various bag fill level requirements. After the platen is raised and sealed against the bottom of the bag covered vacuum cylinder, another bag fill can commence by pushing the remote vacuum start button which will shut the vacuum breaker located at the vacuum pump inlet port.

The operator can view the vacuum filling of the cylinder through clear plastic observation ports located in the vacuum cylinder's vertical wall. When the desired material level is reached, the operator can push a remote electrical stop button which will slowly open the vacuum breaker and automatically drop the vacuum pump's engine to idle. This vacuum breaker valve will bypass approximately 80% of the air flow which will cause the vacuuming and flow of material to cease. The remaining 20% air flow will continue to pass through the entire system, including the vacuuming hose line from its inlet port through the reinjection system to the direct bagger unit, as well as the discharge air line from the direct bagger unit to the vacuum power unit including its filtration system that incorporates a final absolute Hepa filter cartridge. The engine or motor driven positive displacement vacuum pump preferably runs at all times providing continuous negative air to the entire system, even during bag removal and replacement of the filled bag.

The operator can lower the platen along with the partially filled plastic bag by depressing the down button or lowering side of the safety foot valve. As this occurs, more collected material will slide out from the interior of the vacuum cylinder directly into the bag. Prior to the bag's retainer band sliding off the bottom end of the vacuum cylinder, the operator will stop the platen's descent, preferably spin the filled plastic bag to achieve a twist for taping, strapping, wire tieing, clipping, or heat sealing. The bag can be tied without twisting, if so desired. The operator can then cut at the center portion of the twist with a scissors, shears, tree pruner, knife, etc. Afterwards, the operator can remove the filled bag from the platen and transfer it to a truck or other area for storage and disposal.

The upper section (remnant) of the plastic bag remains on the vacuum cylinder to provide a continuous negative air seal and prevent asbestos emissions. After the filled bag is removed, the operator can slip another plastic bag up over the previous bag's upper section (remnant) near the top of the vacuum cylinder and bring down another retainer band over the top end of the new plastic bag. The operator can then raise the platen up against the bag covered opening of the vacuum cylinder by depressing the raise side of the closed-center foot operated valve. After the platen is raised, another bag fill cycle (sequence) can commence by pushing the remote vacuum start button which will again shut the vacuum breaker and bring the engine and vacuum pump up to operating speed.

In the preferred form, a vacuuming inlet hose from the work area, which communicates with and is connected to the reinjection system, will pick up any carry over dust emitted from the direct bagger unit. After entering, depositing material, and exiting from the direct bagger unit, the air containing entrained particulates of dust can be vacuumed via an air inlet line to the inlet port of the second stage cyclone separator which will centrifugally separate most of the carry over dust from the air stream for settlement and eventual flow through dual air lock valves of the reinjection system positioned below the second stage cyclone separator. The cleaner air is directed to flow upwardly and be filtered by high efficiency cartridge filters. The cartridge filters can desirably filter particulates to under ½ micron. Collected dust on the filter surface can be reverse compressed air-pulse released for discharge through the dual air lock valves of the reinjection system and reinjection into the vacuuming recycle line for redepositing into the direct bagger unit. The bagger unit provides a unitary asbestos deposit and removal point.

The reinjection system deposits any carryover dust emitted from the direct bagger unit into a dust reservoir tube located between the dual automatic time-cycled air lock valves for recycle back into the direct bagger unit. Preferably, during the vacuuming process, the top valve will remain open for a time period to fill the reservoir tube by about 50%. During this time period, the lower valve will remain shut. When the reservoir tube reaches 50% full, the top valve will close. After an overlap period of two seconds, where both valves are closed to maintain an air lock, the bottom valve will open allowing the collected particles to drop down and be swept away by the air stream in the vacuuming line below. After a certain period of time, such as three seconds, the bottom valve will close. after another overlap time period, where both valves are again closed to maintain an air lock, the top valve will again open for another 50% fill time period. The automatic cycle timer will continue cycling until the vacuum breaker is opened or the power unit is turned off to provide substantially continuous reinjection of carry over dust.

In the preferred form, the vacuum loader has four stages. The first stage comprises a direct bagger with a centrifugal cyclone to separate the bulk of material vacuumed for deposit directly into the collection bag or a bag inside a drum. The second stage has a cyclone which centrifugally separates out most of the carryover dust for deposit through the reinjection system. The third stage includes a cartridge filtration system which can filter out particulates of dust, preferably at an efficiency of at least about 99.5% at 0.33 microns. The cartridge filtration system can have automatic reverse compressed air-pulse cleaning circuits adjacent the membrane cartridge surfaces to dislodge, clean, and deposit the filtered particles in the reinjection system. The fourth stage contains a final absolute Hepa cartridge filter for the final filtration of the air stream. The Hepa filter preferably has a filtration efficiency of not less than about 99.97% when tested with 0.3 micron thermally generated particles.

In the preferred form, the vacuum loader has a vacuum power package with a positive displacement vacuum pump driven by a 80 BHP engine or motor. The vacuum pump can pull vacuums up to 16 inches mercury mercury (217 inches water).

As used in this Patent Application, the term "dust" means particulate matter, debris and waste, including particulates of asbestos and/or other hazardous material.

The terms "dedust" and "dedusted" as used herein mean removing a substantial amount of dust.

The term "fines" as used herein means small, minute, particulates.

A more detailed explanation of the invention is provided in the following description and appended claims taken in conjunction with the accompanying drawings.

BRIEF DESCRIPTION OF THE DRAWINGS

FIG. 1 is a perspective view of vacuum loader with a bagger unit and a trailerable separation and filtration unit in accordance with principles of the present invention;

FIG. 2 is a cross-sectional side view of the platen positioned adjacent the bottom of the vacuum cylinder of the bagger unit upon startup of the fill cycle and showing an optional drum containing the bag;

FIG. 3 is a cross-sectional side view of the bagger unit with a filled bag near the end of the fill cycle;

FIG. 4 is a top view of the vacuum loader;

FIG. 5 is a cross-sectional side view of the vacuum loader;

FIG. 6 is a top view of the bagger unit;

FIG. 7 is a cross-sectional side view of the platen positioned adjacent the bottom of the vacuum cylinder of the bagger unit upon startup of the fill cycle; and FIG. 8 is a cross-sectional side view of the bagger unit during dispensing.

DETAILED DESCRIPTION OF THE PREFERRED EMBODIMENT

Referring to the drawings, a four stage trailerable, portable vacuum loader 10 (FIG. 1) provides a heavy duty vacuum operated machine and industrial asbestos and hazardous waste material collector with a first stage direct bagger unit 12 and a multistage trailerable, separation and filtration unit 14 for efficiently vacuuming, effectively removing, compactly containing, and safely disposing asbestos, hazardous material, and other particulate matter comprising dry, wet, or fluid entrained, flowable materials, such as fibers, slivers, chips, granular material, fibrous material, pellets, chunks, powders, slurries, liquids, debris, and/or waste. Advantageously, the vacuum loader 10 and bagger unit 12 remove, collect, bag, seal, and dispose asbestos and other material without contaminating the exterior of the bag or other container and with out exposing the operator and other surrounding personnel to the collected asbestos or other collected material.

Direct Bagger Unit

The first stage, vacuum powered, direct bagger unit 12 (FIGS. 1-7), which is also sometimes referred to as a bagging unit or bagger, has a vacuum operated bagger assembly 16. The vacuum operated bagger assembly 16 has an upper bulk separation chamber 18 with a roof 20 which provides a top and a lower asbestos dispensing chamber 22 which is positioned substantially below the upper bulk separation chamber 18. The upper bulk separation chamber 18 contains a first centrifugal or tangential cyclone 24. The cyclone 24 makes a gross cut, partially dedusts, separates, and removes substantial amounts of particulates of asbestos and other dusty material from an influent dust laden air stream.

As shown in FIGS. 1 and 5, the upper bulk separation chamber 18 has a radial inlet port 26 which communicates with the first cyclone 24 to feed the influent dusty air stream to the first cyclone 24. The upper bulk separation chamber also has an outlet port 28 which communicates with the first cyclone 24 to discharge from the cyclone 24 partially dedusted effluent air containing a lesser concentration of asbestos than the influent dusty air stream.

The lower asbestos dispensing chamber 22 of the bagger unit 12 (FIGS. 1-7) has an elongated, substantially vertical, tubular vacuum cylinder 30 which provides an asbestos filling member that extends downwardly below the cyclone 14 to discharge particulates of asbestos removed by the cyclone 24. The vacuum cylinder 30 has an upper inlet portion 32 which is positioned adjacent the cyclone 24 and has an open ended, lower discharge portion 34 with a downwardly facing discharge opening or mouth 36 which positoned substantially below the cyclone 24. The lower discharge portion 34 has a seal gasket positioned about and adjacent the discharge opening 36. The vacuum cylinder 30 has a set (array) of holes or apertures 31 (FIG. 8) to relieve negative pressure and suction when the bag 44 is filled and removed. The holes 31 can also be used to hold and grasp the bag 44 under suction and negative pressure without the use of a separate retainer. A pressure relief valve or trap door can also be used to relieve negative when the bag is filled and removed. The vacuum cylinder 30 can also have one or more transparent observation ports 33.

The vacuum operated bagger assembly 16 has a deflector 39 (FIG. 2) which is positioned in proximity to the vacuum cylinder 30 to minimize and substantially prevent upward backflow and reentrainment of the asbestos and other dusty material. The deflector 39 preferably comprises a triangular baffle or conical defector with an upwardly pointing apex extending below the cyclone 24. One or more spiral baffles, helical baffles, annular baffles or rings, can also be used.

As shown in FIG. 1, an inlet and recycle flexible hose or conduit 42 is operatively connected to and communicates with the inlet port 26 for ingress of the influent dusty air stream into the cyclone 24 of the vacuum operated bagger assembly 16. A flexible outlet, discharge hose or conduit 43 is operatively connected to and communicates with the outlet port 28 of the vacuum operated bagger assembly 16 for egress of the partially dedusted effluent air from the upper chamber 18 of the vacuum operated bagger assembly 16 into the separation and filtration unit 14 for further dedusting.

In order to contain the asbestos or other collected material, a flexible container comprising an elongated expandable transparent bag 44 is positioned externally about, abuts against, and is sealed to the outside surface of the upright cylindrical wall of the tubular vacuum cylinder 30 to receive asbestos removed from the cyclone 24 through the tubular vacuum cylinder 30. A single or double ply bag 44 can be used. A retainer 46, such as an elastomeric rubber band, strap, string, wire, or tie, can be used to securely attach and seal the upper portion of the bag 44 to the outside surface of the vacuum cylinder 30. While transparent plastic bags are preferred for best results, it may be desirable in come circumstances to use opaque bags or bags made out of paper, paperboard, fabric, fabric, rubber, or woven metal. Furthermore, in come circumstances it may be desirable to use rigid or semi-rigid containers, such as barrels, bins, receptacles, vessels, or drums made of metal fiberglass, plastic, or wood, in conjunction with the bag to hold, contain, and support the bag, or in lieu of bags.

The bagger unit 12 (FIGS. 1 and 5-7) has a support base 50, with optional wheels or casters. The base 50 can be positioned upon the ground, floor, or pavement to stabilize and support the vacuum operated bagger assembly 16. The base 50 has side members 52 and 54 (FIG. 6) which are positioned laterally outwardly of the vacuum operated assembly 16 and has rearwardly inclined back members 56 and 58 which extend between and connect the side members 52 and 54 at a location that is spaced rearwardly of the vacuum operated bagger assembly 16.

An elongated upright arm assembly 60 (FIGS. 7 and 8) extends upwardly from the base 50. The arm assembly 60 has a vertical elongated arm 62 which is fixedly secured to and extends above the base 50 to a height above the vacuum cylinder 30. The vertical elongated arm 62 is spaced rearwardly of the vacuum operated bagger assembly 16. The arm assembly 60 also has a horizontal overhead arm 64 which is cantilevered from and fixedly secured to an upper portion of the vertical elongated arm 62. The horizontal overhead arm 64 is substantially smaller than the vertical elongated arm 62 and extends forwardly of the vertical elongated arm 62 to engage the upper chamber 18 of the vacuum operated bagger assembly 16. The arm assembly 16 has a pin or other connector 66 (FIG. 6) to secure the horizontal overhead arm 64 to the upper chamber 18 of the vacuum operated bagger assembly 16 and elevate and space the vacuum operated bagger assembly 16 above the base 50.

In order to support and seal the bottom of the bag 44, or a drum or other container containing the bag, there is provided a moveable platen 70 (FIGS. 1 and 6) comprising a substantially horizontal, arcuate support platform 72 with a straight front edge 73 and an elastomeric pad 74. The platen 70 abuttingly engages and supports the bottom of the bag 44 or a drum 45 (FIG. 2) containing the bag 44. The platen 70 has an upright curved arcuate wall portion 76 (FIGS. 1 and 6) which provides a generally triangular arcuate back that extends upwardly and rearwardly from the horizontal support platform 72 to abuttingly engage and support a side portion of the bag 44 or drum 45. As best shown in FIGS. 7 and 8, the platen 70 preferably has one or more spacer safely flanges 78 which extends downwardly from the support platform 72 to elevate the support platform 72 above the ground to prevent the support platform 72 from engaging and crushing the toes of the operator.

In the illustrative embodiment, a pneumatic power assembly 80 (FIGS. 6–8) is provided to move the platen 70 up and down. The pneumatic power assembly 80 comprises an upright elongated slotted cylindrical track 82 which is mounted against the vertical elongated arm 62. A lift cylinder 84 comprising a vertically reciprocating piston is positioned in the interior of the track 82. A coupling member or assembly 86 securely connects the lift cylinder 84 to the back of the platen 70. A compressed air tank is operatively connected to the lift cylinder 84 via tubing. In order to selectively move the platen 70 as desired by the operator, a safety foot operated pedal valve 90 (FIG. 1) is provided. The foot operated pedal valve 90 is operatively connected by lines 91 to the compressed air tanks and lift cylinder 84 to lower the platen 70 as the bag 44 is being filled with the asbestos or other dusty material and to raise the platen 70 during startup.

Trailerable Separation and Filtration Unit

The trailerable separation and filtration unit 14 (FIGS. 1, 4, and 5) is spaced externally of and moveable towards and away from the first stage separate bagger unit 12. The separation and filtration unit 14 has a second stage cyclone compartment 100 with a cyclone inlet 102 which is connected to the outlet discharge hose 43 for receiving partially dedusted air with carryover asbestos from the upper bulk separation chamber 18 of the bagger unit 12. The second stage cyclone compartment 100 contains a second centrifugal or tangential cyclone 104 which is spaced externally and laterally from the first centrifugal cyclone 24 in the upper bulk separation chamber 18 of the bagger unit 12 for further dedusting, separating, and removing a substantial amount of particulate of asbestos from the partially dedusted air from the first stage bagger unit 12.

The trailerable separation and filtration unit 14 (FIGS. 1, 4, and 5) has a third stage filtration compartment 110 which is positioned above and communicates with the second stage cyclone compartment 100. The third stage filtration compartment 110 has a filtration chamber 112 with a set of canisters 114–117 which contain tubular filters 118. The tubular filters 118 are spaced along side of each other to partially filter the effluent air containing particulates of asbestos and other dusty material from the second stage cyclone compartment 100. A set of air pulse injectors 121–124 are connected to compressed air tanks 125–128 to periodically inject intermittent blasts of air upon the tubular filters 118 to help clean the tubular filters 118.

The third stage filtration compartment 110 is positioned above the second stage cyclone separation compartment 100 and along side and spaced laterally away from the bagger unit 12 and the fourth stage Hepa-type filtering compartment 130. The open bottom portion of the third stage filtering compartment 110 provides an inlet opening for entrance of the partially dedusted stream of air and/or liquid from the second stage tangential cyclone 104. The lower portion and annular outer portion of the third stage filtering compartment 110 can provide centrifugal or chamber which accelerates and/or passes the dusty air and/or liquid centrifugally with sufficient kinetic energy to remove a substantial amount of particulates of dust from the dusty air and/or liquid before the dusty air and/or liquid enters and passes through the filters 114–117 in the third stage filtering compartment 110.

In the preferred embodiment, the inner central portion of the third stage filtering compartment 110 provides a filter chamber that contains a concentric set or series of four tubular filters 114–117. The filtering compartment 110 has a set or series of four air injectors 121–124 which are connected by compressed air lines or conduits to compressed air tanks 125–128 to sequentially inject intermittent pulses of air on the filters 114–117 to clean the filters. In some circumstances, it may be desirable to use more or less filters, different types of filters, or other types of filter cleaning equipment, such as mechanical shakers and vibrators.

As shown in FIGS. 1 and 5, the third stage filtering compartment 110 has a domed roof 129 or top above an annular cylinder or circular upright wall 131. The upper portion of the wall 131 has an outwardly extending, circular flange which is sealed to the skirt of the domed roof 129 by a rubber, annular circular gasket, o-ring, or seal. An intermediate conduit 132 is connected to and communicates with the domed roof 129 of the third stage filtering compartment 110 and the fourth stage Hepa-filtering compartment 130. If desired, the filtering compartment can also have ports, slots, tubes, or nozzles for passing, conveying, and injecting the partially dedusted air containing asbestos fines and smaller particulates of hazardous material into the cartridge filters.

The trailerable separation and filtration unit 14 (FIGS. 1, 4, and 5) also has a fourth stage filtration compartment 130. The fourth stage filtration compartment 130 is positioned downstream and spaced laterally away from the third stage filtration compartment 110. The fourth stage filtration compartment 130 is located generally along side of the second stage cyclone compartment 100 and the third stage filtration compartment 110. An intermediate conduit 132 connects the third stage filtration compartment 110 and the fourth stage filtration compartment 130.

The fourth stage filtration comparment 130 contains a Hepa-type filter 134 to substantially filter, deduct, and remove the remaining particulates of asbestos and other dusty material from the partially filtered air which has exited the third stage filtration compartment 110. The Hepa-type filter can be a model 13XT absolute Hepa filter manufactured by Cambridge Filter Corporation of Syracuse, New York, having an efficiency of greater than 99.97% when tested with 0.3 micron thermally generated particles. Such filters have an X-body construction with tapered separators for high capacity capabilities and exceed the leak-free scan requirements set forth in Federal Standard 209 when tested to a penetration level of 0.001%. These filters can also have a glass or a glass-paper media, aluminum separators, a 16 gauge steel casing, a urethane seal, and neoprene gaskets.

The Hepa-type filtering compartment 130 (FIG. 1) can have a chamber, housing, or Hepa-type filter tank 136 with a ceiling, floor, upright side wall, and end walls. One of the walls can have one or more access doors 140 with a handle for access into the interior of the fourth stage filtering compartment 130. The doors 140 can be sealed to the end walls by a rubber gasket or seal.

The Hepa-type filtering compartment 130 can have a turnbuckle and clevis hanger assembly with an upper vertical bar which is connected to and hangs downwardly from the ceiling. The turnbuckle and clevis hanger assembly can have a pair of cross bars which can be hooked to the ceiling by a chain. The turnbuckle and clevis hanger assembly can have a lower vertical bar which can be connected to a horizontal C-bar and filter support. The Hepa-type filter can hang downwardly from and be supported and carried by the C-bar and filter support.

As best shown in FIG. 5, a dual valve reinjection compartment 150 is located below and communicates with the second stage cyclone compartment 100 via a frustoconical hopper 151. The reinjection compartment 150 has a resevoir tube 153 comprising a cylindrical or tubular collection chamber to collect and receive the asbestos and other dusty material removed by the second tangential cyclone 140 in the second stage cyclone compartment 100. The reinjection compartment 150 has an outlet 152 connected to and communicating with the recycle hose 42 to feed the collected asbestos and other dusty material, as well as the influent dusty air laden with particulates of asbestos, to the bagger unit 12. An inlet 154 (FIGS. 1 and 4) communicates with the reinjection compartment 150 via an intake tee. A flexible influent hose 156 is connected to the inlet 154 to feed influent dusty air laden with particulates of asbestos and other dusty material to the reinjection compartment 150.

The reinjection compartment 150 (FIG. 5) has a first upper valve 158 and a second lower valve 160. The first upper valve 158 is normally open to permit passage of the asbestos and other dusty material removed from the tangential cyclone 140 of the second stage cyclone compartment 100 into the reinjection compartment 150. The first upper valve 158 can be closed to substantially lock and prevent passage of the asbestos and other dusty material removed from the tangential cyclone 104 of the second stage cyclone compartment 100 into the reinjection compartment 150 when the second lower valve 160 is open. The second lower valve 160 can be normally closed when the first upper valve 158 is open and when the bag 44 is filled to substantially block and prevent passage of the influent dusty air and the collected asbestos and the other dusty material in the reinjection compartment 150 into the bagger unit 12. The second lower valve 160 can be open when the first upper valve 158 is closed to permit ingress of the influent dusty air and the collected asbestos and other dusty material in the reinjection compartment 150 into the bagger unit 12. The reinjection airlock-feed system can also comprise a rotary air lock valve, a pinch type air lock valve, or any other air lock feed valve system.

A vacuum pump 170 (FIGS. 4 and 5) communicates with the compartments 100, 110, and 130 and the bagger unit 12 to draw and suck air or other fluid containing the particulates of asbestos and other dusty material through the compartments 100, 110, and 130 and the bagger unit 12. The vacuum pump 170 communicates with a muffler or exhaust silencer 172 and an overhead vent 174 via an exhaust conduit 175 (FIG. 4). The vacuum pump 170 can include a pneumatic pump, air blower, fan, turbine, or compressor.

The vacuum loader 10 can also have a 12 volt control panel 176 (FIG. 1), which when energized and activated, provides 12 voltage and power for the operation of a solenoid valve connected to the vacuum breaker 178 (FIG. 5), as well as four solenoid air valves connected to the primary filter cartridge's reverse pulse cleaning circuit, and two solenoid air valves connected to the dust reinjection system's dual air lock valves 158 and 160. The control panel 176 (FIG. 1) can have gauges, such as a pump gauge to indicate the vacuum in inches of mercury (Hg) at the vacuum pump 170, a primary filter differential gauge, and a final absolute Hepa filter differential gauge. The control panel 176 can also have switches to limit filtering operation between 0.07 inches and 5 inches of $H_2O$ across the Hepa filter 134. In the preferred control panel 176, less than 0.07" $H_2O$ differential across the Hepa filter 134 indicates that there is no absolute Hepa filter 134 in third filtering compartment housing 130. Over 5" $H_2O$ differential indicates that the Hepa filter 134 was at maximum dust loading requiring immediate replacement. The vacuum breakers 178 are electrically connected to remain open and prevent vacuuming if either of the preceding conditions exits.

The towable, over the road, trailer-mounted, vacuum loader 10 in conjunction with the direct bagger unit 12 is capable of vacuuming asbestos, fibrous material, and wet and/or dry flowable particulate matter, such as granular material, chunks, powders, liquids, slurries, pellets, etc. In the preferred embodiment, the vacuum loader 10 has a 80 hp, engine or motor 180 (FIG. 5) which drives a positive displacement vacuum pump 170 to provide air flow for up to a 6 inch diameter hose operation and vacuum wet/dry fibrous materials and contaminated soil at up to 16 inches mercury (Hg) vacuum. The vacuum pump engine or motor package can be equipped with a drive guard 178 (FIG. 5), base, engine or motor vacuum pump controls, gauges, exhaust silencer 172, starter switch, and throttle. The vacuum loader 10 can also have a 20 scfm, 10 HP engine or motor driven compressed air package to provide compressed air for reverse air-pulse filter cleaning and the air actuated valves 158 and 160. The compressor-engine package can be equipped with a drive guard 182, base, controls, exhaust muffler, and starter switch.

The vacuum loader 10 can also have a 12 volt electrical control panel 176 (FIG. 1) equipped with: a vacuum pump gauge, vacuum differential gauges, switches, start/stop push buttons, a cartridge filter cleaning pulse timer circuitry package, indicating lights, relays, a Hepa filter monitoring gauge, and a timer/circuitry package for the reinjection system. Desirably, the vacuum loader 10 has a pneumatic circuit and valves for operation of vacuum breaker 178 (FIG. 5), reinjection system air lock valves 158 and 160, and reverse air-pulse circuit. The vacuum loader 10 can also have a sound enclosure 184 (FIG. 5) for approximately 99 DBA at 3 meters distance from the outdoors.

In the preferred embodiment, the vacuum loader 10 (FIGS. 1, 4, and 5) is supported on a common base frame for mounting on a 10,000 lb. load capacity over-the-road trailer 186. The over the road tandem axle trailer 186 can be equipped with hydraulic surge brakes, a break-away emergency brake system, emergency brakes, a lighting system, break-away chains, and four 7,000 lb. jack stands 189. The tandem axle trailer 186 can be towed by a 7,200 lb. tow bar capacity truck. The trailer 186 can have a main frame 188 made of carbon steel, stainless steel, anodized steel, or other metal. The trailer 186 has a tow bar 190 which can extend longitudinally outwardly from the abutment plate or flange plate 192 along the longitudinal centerline of the trailer assembly 186. The tow bar 190 can have a drum ball tow coupler and tow hitch to enable the vacuum loader 10 to be pulled to the collection or storage site by a tow truck or other suitable vehicle equipped with a mating tow bar, ball, or hitch. The tow bar 190 can be connected to a top wind jack with an upper crank and lower base plate or foot. Other wind jacks are connected to other portions of the trailer. If desired, more jacks can be used. In use, the jacks 188 level, stabilize, and balance the trailer 186 and vacuum loader 10 on driveways, inclined pavements, floors, and other surfaces at the collection site during stationary vacuum operation of the vacuum loader 10.

The underframe of the trailer assembly 186 includes a set of wheel assemblies 192 positioned about the middle of the trailer 186. The wheel assemblies 192 comprise four wheels 194 and can have oil lubricated hub and drums, electric brakes, and tandem axles. The trailer assembly can also have a hydraulic surge braking system and a fire extinguisher 196. A gas tank with a gas inlet tube can be mounted to the trailer assembly 186. A battery can be seated upon and secured to the trailer assembly 186. The gas tank and battery are connected to a drive engine package mounted on the trailer assembly.

The drive engine package can include a V-belt driven air blower, vacuum pump 170 (FIGS. 4 and 5), fan, or exhauster engine and a compressor engine or compressor. The drive engine or motor package can be controlled by and operatively connected to a control panel 176 (FIG. 1). The air blower can be operatively connected to and driven by a motor via drive belts 198 (FIGS. 4). The air blower (vacuum pump) creates a vacuum (suction) to draw dust and direct influent dusty air (air laden with particulates of of asbestos and/or other particulate material) through the bagger unit 12 and vacuum loader 10.

Operation

The vacuum loader 10 with the direct bagger unit 12, the filtration and separation unit 14, and the reinjection system 150 (compartment) effectively, efficiently, and safely collect and directly bag asbestos fibers, dust laden liquids, dry dusty materials, contaminated sand and soil, and other particulate matter, without emitting, exposing, or leaking the collected material to the atmosphere. Total collection vacuuming and direct bagging (collection directly in the bag) by the vacuum loader 10 and direct bagger unit 12 of asbestos, asbestos contaminated soil and sand, both wet and dry materials, and contaiminated liquids, is very desirable to minimize contaimination and exposure of personnel to the vacuumed material. Additionally, the vacuum loader 10 provides a total vacuuming system which is under continuous negative pressure from the vacuuming hose inlet port to the vacuum producing pump inlet port during all vacuuming cycles throughout the operating day and shift to substantially prevent the release of vacuumed, collected, or bagged asbestos or other dusty material to the atmosphere.

Prior to startup, a bag 44 comprising the container is slipped over the lower discharge end 34 of the upright tubular vacuum cylinder 30 comprising the filling member. The bag 44 is secured, retained, and sealed to the exterior surface of the upright wall of the upright tubular vacuum cylinder 30 with a rubber elastomeric band 46 or other retainer means. The platen 70 is then elevated against the bottom of the bag 44 and raised and sealed to a position adjacent the discharge opening 36 prior to dispensing the asbestos or other material into the bag 44.

Upon startup of the vacuum loader 10, a dusty fluid, such as air laded with asbestos or other dusty material is drawn and sucked into the inlet of the bagger unit 12. In the bagger unit 12, a substantial amount of asbestos or other material are partially centrifugally separated and removed from the dusty fluid in the first centrifugal cyclone 24. The removed asbestos or other material is discharged from the discharge opening 36 of the tubular vacuum cylinder into the bag 44. Advantageously, the first cyclone 24 and conical baffle 39 (deflector) substantially prevent upward backflow of asbestos or other material in the bagger unit 12.

The partially dedusted air or other fluid is conveyed from the bagger unit 12 to the separation and filtration unit 14 via a discharge line 43 where it is centrifugally separated in a second cyclone 104. The remaining dusty fluid is partially filtered in the set of canister filters 114–117 (FIG. 4). The partially filtered fluid is further filtered in a Hepa-type filter 134 to substantially remove the remaining asbestos or other material from the dusty fluid. The filters 114–117 can be periodically cleaned by intermittently injecting pulses of air onto the filters 114–117 with the pulsed air injectors 121–124. The centrifugally separated asbestos or other particulate material from the second cyclone 104 is collected in the dual valve reinjection compartment 150 and sequentially fed and recycled to the bagger unit 12.

Asbestos and other particulate material is dispensed and metered into the container through the tubular vacuum cylinder 30 (filling member) under suction and negative pressure. When a desired amount of asbestos or other particulate material is dispensed into the container, such as when the bag 44 is almost filled, the platen 70 is lowered while the platen 70 abuttingly engages and supports the bottom of the container. As the plate 70 is lowered, the bag 44 will slide downwardly along the tubular vacuum cylinder 30 by gravity flow under the weight of the asbestos or other material in the bag as the bag 44. The platen 70, retainer 48, and seal at the bottom of the vacuum cylinder 30, substantially prevent the asbestos and other vacuumed material from contacting and contaminating the exterior of the bag 44 and from being emitted into the atmosphere about the operator during operation of the vacuum loader. After the bag 44 is filled to the desired amount with asbestos or other material, dispensing of the vacuumed asbestos and other material is suspended, the suction and negative pressure are partially relieved, the platen is lowered, the bag 44 is turned, optionally spun, and twisted beneath the discharge opening 36 and bottom of the tubular vacuum cylinder 30 as shown in FIG. 3, and tied and sealed with a tie clip, twist tie, or by heat sealing. If desired, the bag 44 can be tied and sealed without being first turned, spun, and twisted, but it is not as effective. The bag 44 is then cut or otherwise severed from the tubular vacuum cylinder 30 leaving a remnant 200 comprising the upper portion of the bag 44. The upper portion 200 of the bag is tied as well as the lower portion of the bag. The remnant 200 remains retained and temporarily attached to the exterior surface of the upright wall of the vacuum cylinder 30. The severed bag 44 is then removed and placed in a truck or other storage area for transport and disposal. Thereafter, a new bag 44 is slipped over the remnant 200 and attached to the outside of the tubular vacuum cylinder 30 by another retainer 46 (rubber band) and the filling cycle (sequence) is repeated.

The contaminated material is air conveyed under negative pressure to the direct bagger unit 12 after passing through the reinjection system 150, which can be up to 1,000 feet away from the end of the vacuuming hose 156 when vacuuming lightly wetted asbestos and up to 500 feet away when vacuuming contaminated soil. Since the vacuuming hose 156 is always under continuous negative pressure while direct bagging material from bag fill to bag fill, there is always a negative pressure and suction and never a static or positive air pressure condition in the vacuuming hose 156 and through the entire system.

The vacuumed material enters the direct bagger unit 12 where the first cyclone 24 centrifugally separates out the bulk of vacuumed material from the air stream for depositing directly into a single, double, or multiple ply plastic bag 44. The plastic containment bags 44 are slipped over and retained on the outside surface of the vacuum cylinder 30 with a rubber band or other retainer 46 by the operator. After the plastic bag 44 is slipped over the vacuum cylinder 30 and the closed bottom end of the plastic bag 44 is pulled up against the open bottom end of the vacuum cylinder 30, the operator will raise the rubber faced bagger platen 70 up to seal off the vacuum cylinder's full bottom orifice 36 (discharge opening) resulting in a 100% vacuum seal for vacuum collection of material, i.e. this places the plastic bag 44 between the straight or slightly flared out vacuum cylinder's full orifice 36 with optional gasketed bottom opening edge and the platen's rubber seal gasket. For additional support and containment, the bags 44 can be placed in a steel, plastic, or fiberglass drum 45 (FIG. 2) upon the platen 70.

The operator can vacuum fill the vacuum cylinder 30 and view the fill level which is visible through the transparent plastic bags 44 and the one or more clear plastic observation ports 33 provided in the vacuum cylinder's vertical wall. When the desired material level is reached, the operator will push a remote electrical stop button which will open a vacuum breaker 178 (FIG. 5) at the power vacuum unit's vacuum pump inlet port. The vacuum breaker valve 202 (FIG. 5) will bypass approximately 80% of the air flow and cause the vacuuming and flow of material to cease. The approximately 20% remaining air flow will continue to pass through the entire system including the vacuuming hose running from the hose inlet port to the direct bagger unit 12, the 6 inch air line running from the direct bagger unit 12 to the vacuum power unit, the vacuum power unit, and the filtration unit 14 which has a final absolute Hepa filter 134. The Hepa filter 134 can filter virtually all, preferably at least about 99.97% of any dust when tested with 0.3 micron thermally generated particles. The vacuum loader 10 operates under negative air pressure during all phases of the vacuuming operation. The engine-driven positive displacement vacuum pump 170 runs continuously at all times to provide a continuous negative air condition to the entire system and preventing any possible asbestos dust release to the atmosphere.

The operator can lower the platen 70 with the partially filled bag 44 causing the collected material to slide out from the interior of the vacuum tube 30 (cylinder) directly into the bag 44. Thereafter, the operator will stop the platen's decent, spin the filled plastic bag 44 to achieve a long twist for tape, tie, or preferably heat seal the bag, and then cut the bag twist at center or between ties. After cutting the filled lower portion of the plastic bag 44 from the upper plastic bag portion or remnant 200 (FIG. 3) which will remain on the vacuum cylinder 30 to provide a continuous negative air seal at the vacuum cylinder's bottom opening 36 so as to prevent emissions of the vacuumed material. The operator will remove the tape sealed, tied, or preferably heat sealed bag 44 from the platen 70 and transfer the bag 44 to storage and disposal.

The operator can slip another plastic bag 44 up over the bottom of the tied or heat sealed bag remnant 200 which has been left in place near the top of the vacuum cylinder 30. The operator can bring down another retainer band 46 over the top end of the new plastic bag 44. The retainer bands 46 can be stored near the top of the vacuum cylinder 30. The operator can again raise the platen 70 up against the bag covered discharge opening 36 of the vacuum cylinder 30 by depressing the raise side of the closed center foot operated valve 90 located adjacent to the bagger support base 50. The foot valve 90 frees both the operator's hands for the operational functions. Desirably, with the closed center foot valve 90, the operator can stop the platen 70 at any desired height when lowering it away from the vacuum tube 30. The desired platen height will vary with various bag fill level requirements. After the platen 70 is raised and sealed against the bottom of the bag covered vacuum cylinder 30, another bag fill can commence by pushing the remote vacuum start button which will again shut the vacuum breaker 178 located near the inlet of the vacuum pump 170 to resume vacuuming.

A 5 or 6 inch diameter vacuuming line or inlet hose 156 from the work area can run across and communicate with the reinjection system air lock's 6" horizontal pipeline of inlet tee to pick up any carryover dust previously emitted from the bagger unit 12. Exiting from the bagger unit 12, the air with entrained particulates of asbestos of other dust can be vacuumed via a 6 inch air line to the inlet of the second stage cyclone separator 104. The second stage cyclone separator 104 centrifugally separates most of the carryover dust from the air stream for settlement and eventual flow through the dual 6" air lock valves 158 and 160 or airlock feeder of the reinjection system 150 (compartment) positioned below the second stage cyclone separator 104. The cleaner, centrifugally cycloned air will be drawn (sucked) upwardly and be filtered by the high efficiency cartridge filters 114-117 which will filter the particulates down to under 1 micron, preferably at an efficiency of about 99.5% at about 0.33 microns. Collected dust on the surface of the filters 114-117 can be reverse air-pulse cleaned by variable pulse speed, air pulse injectors 121-124 for discharge through the dual air lock valves 158 and 160 of the reinjection system 150 into a 6 inch vacuuming recycle line 40 for redepositing (reinjection) and recycling into the direct bagger unit 12.

The dual valve reinjection system 150 (FIG. 5) can return any carryover dust to the direct bagger unit 12 via the recycle line 42. In the preferred embodiment, the reinjection system 150 (compartment) has a dual 6 inch diameter automatic time cycled air lock valves 158 and 160 with a ½ cubic foot reserve tube 152 providing a collection chamber between the valves 158 and 160. The top valve 158 will remain open for a time period to fill the reserve tube 152 by 50%. The lower valve 160 will be shut during this period. When the reserve tube 152 reaches 50% full, the top valve 158 will close. After an overlap period of about two seconds where both valves 158 and 160 are closed to maintain an air lock, the bottom valve 160 will open and allow the collected material to drop down and be swept away by the air stream in the vacuuming recycle line 40. After a time period of about three seconds, the bottom valve 160 will close. After an overlap time period of about two seconds where both valves 158 and 160 are again closed to maintain an ait lock, the top valve 158 will again open for another 50% fill time period. The automatic cycle timer will continue this cycling until the vacuum breaker 178 is opened or the 12 volt the power is turned off to assure continuous reinjection of the carryover dust to the direct bagger unit 12. Other air lock feeder mechanisms can be used.

The vacuum loader 12 has a first stage direct bagger 12 with a centrifugal cyclone separator 24 to separate the bulk of the particular material for deposit directly into the plastic collection bag 44. The second stage centrifugal separator 104 separates out most of the carry over for deposit to the reinjection air lock valves 158 and 160 of the reinjection system 150 below. The third stage cartridge filters 114-117 filter out dust and particles down to under 1 micron. Air pulse injectors 121-124 periodically reverse air pulse clean the membrane surfaces of the filters 114-117. The removed and centrifugally separated filtered particles fall by gravity to the reinjection air lock system 150 below for recycling and reinjection into the bagger unit 12. The fourth stage final absolute Hepa cartridge filter 134 further dedusts and filters the effluent air stream exiting the cartridge filters 114-117. Desirably, the Hepa filter has a filtration efficiency of not less than about 99.97% when tested with 0.3 micron thermally generated particles.

In the preferred embodiment, the vacuum loader 10 has a vacuum power package with a positive displacement vacuum pump 170 (FIG. 5) that is driven by a 80 BHP engine or motor 180. The vacuum pump 170 can pull vacuum up to 16 inches (Hg) mercury (217 inches water). The blower engine is started by turning the ignition switch to the on position and subsequently turning the starter switch to start the engine. Preferably, the blower runs with the engine idling at 650 RMP for a 3 minute warm-up period. Since the vacuum breaker 178 is closed and the engine 180 is at idle, air flow will be approximately 25% of full flow in the vacuuming hose and vacuum loader system. The blower engine preferably operates at 2800 rpm to vacuum the material. The air compressor engine is started by: turning the ignition switch to the on position and subsequently pushing the starter button to start the engine. The air compressor can provide air pressure at about 100 psi for: reverse pulse air cleaning of the primary filters 114-117, operation of the vacuum breakers 178, and operation of the dust reinjection system's dual air lock valves 158 and 160.

When the operator engages the safety foot pedal valve 90 (FIG. 1) of the direct bagger unit 12, the vacuum breaker valve 202 (FIG. 5) will close and vacuuming will commence and continue until the direct bagger's collection bag 44 is filled up to about a 2.5 foot high fill level. Preferably, during removal of the filled bag 44 from the direct bagger unit 12 and replacement of a new bag 44 on the vacuum cylinder 30: the vacuum pump engine and blower will continue to run at about 2800 rpm which will continue to provide continuous negative air flow to the entire vacuum loader system and the compressor engine will continue to run. However, the reverse air-pulse cleaning of the four cartridge filters 114-117 will stop during this period as the dust reinjection system's lower air lock valve 160 will close. After installing another plastic bag 44 over the vacuum cylinder 30, the operator can push the start vacuuming button, which will close the vacuum breaker 178. This will cause the conveying air to flow again through the inlet vacuuming hose 156 and vacuuming of particulate material to resume.

The direct bagger unit 12 can have a vacuum fill cylinder 30 with an edge seal gasket, a lift platen 70 with a gum rubber seal gasket, a lift cylinder 84, a center closed position foot valve 90 to stop the platen 70 at any height, compressed air lines, a filter, a lubricator pressure regulator, a cyclone separator 24 with a 6 inch tangential entry port and 6 inch outlet port, a support structure, and a base 50. The direct bagger unit 12 can be easily dissembled for manual movement and storage. A 6 inch diameter interconnecting hose 42 can connect the reinjection pipe 153 to the direct bagger's 6 inch tangential inlet connection port 26. A second 6 inch diameter interconnecting hose 43 can connect the 6 inch diameter direct bagger's outlet port 28 to the vacuum power unit's 6" diameter tangential inlet port 102. If desired, a moveable vacuum cylinder (filling tube) can be used with a stationary platen.

Applicant's vacuum loader, bagger unit, and process produced unexpected surprisingly good results in removing, collecting, sealing, and disposing asbestos fibers and other particulate material over conventional vacuum cleaners (loaders).

Among the many advantages of the vacuum loader and process are:

1. Excellent separation and removal of asbestos fibers and large particulates of dusty material.
2. Continuous negative air in all phases of operation and prevention of emissions.
3. Better solids-gas separation.
4. Compact collection of asbestos and other material.
5. Superior containment and sealing of the collected material.
6. Enhanced air purification.
7. Greatly reduced operator exposure to asbestos.
8. Good load-carrying, collection capacity.
9. Greater efficiency of operation.
10. Excellent dedusting.
11. Cost effective.
12. Economical.
13. Easy to install, remove, and repair.
14. Simple to use.
15. Less maintenance.
16. Effective.
17. Efficient.
18. Dependable.
19. Safe.

Although an embodiment of the invention has been shown and described, it is to be understood that various modifications and substitutions, as well as rearrangements of parts and process steps, can be made by those skilled in the art without departing from the novel spirit and scope of this invention.

What is claimed is:

1. A vacuum loader for removing asbestos hazardous material, and other particulate matter, comprising:
   first separator means for partially dedusting and separating a substantial amount of particulates from a dusty fluid;

second separator means positioned downstream of and communicating with said first separator means for further dedusting and substantially removing the remaining particulates from said partially dedusted fluid;

first conduit means connected to and communicating with said first and second separator means for passing said partially dedusted fluid from said fluid separator means to said second separator means;

reinjection means located between and communicating with said first and second separator means, said reinjection means comprising a collection chamber positioned downstream of said second separator means for collecting particulates removed by said second separator means;

inlet conduit means comprising an influent vacuuming hose connected directly to and communicating with said collection chamber for vacuuming a dusty fluid containing particulates of asbestos or other material under a substantially continuous negative pressure and for passing said dusty fluid containing said particulates to said collection chamber; and second conduit means positioned downstream of said second separator means and connected to and communicating with said first separator means and said collection chamber for feeding and recycling said collected particulates and said dusty fluid from said collection chamber to said first separator means; and said reinjection means comprising substantially continuous air lock means for regulating ingress of said particulates into said collection chamber and for regulating egress of said dusty fluid and said particulates into said recycle hose.

2. A vacuum loader in accordance with claim 1 wherein said first separator means further comprises a bagger unit containing a baffle.

3. A vacuum loader in accordance with claim 1 wherein said second separator means comprises a cyclone and said collection chamber provides a reinjection compartment located between and communicating with said first and second separator means.

4. A vacuum loader in accordance with claim 1 wherein said second separator means further comprises a set of filter canisters positioned above said collection chamber.

5. A vacuum loader in accordance with claim 1 wherein said continuous air lock means of said reinjection means includes dual air lock valves comprising a normally open inlet air lock valve for regulating ingress of said particulates into said reinjection compartment and a normally closed outlet air lock valve for regulating egress of said dusty fluid and said particulates into said recycle hose.

6. A vacuum loader for removing asbestos, hazardous material, and other particulate matter, comprising:

a vacuum operated bagger assembly having an upper bulk separation chamber containing a first cyclone for partially dedusting, substantially separating, and removing a substantial amount of asbestos, hazardous material, or other particulate matter from a fluid laden with said asbestos, hazaradous material, or other particulate matter, a filling member comprising a foraminous vacuum cylinder extending downwardly from said first cyclone for substantially filling a cntainer with said removed asbestos, hazardous material, or other particulate matter under negative pressure, a substantially conical deflector positioned between said vacuum cylinder and said container for substantially minimizing backflow of said removed particulate matter, platen means comprising a foot pedal valve and a vertically reciprocating pneumatically powered platform actuated by said foot pedal valve for raising and lowering said container;

separation and filtering means positioned downstream of and communicating with said vacuum operated bagger assembly, said separation and filtering means having a second cyclone for further partially dedusting, separating, and removing particulate matter from said fluid and having filtering means positioned downstream of said second cyclone for filtering said partially dedusted fluid;

an inlet hose for drawing said fluid laden with said asbestos, hazardous material, and other particulate matter under substantially continuous negative pressure;

reinjection means comprising substantially continuous air lock means and a reinjection compartment positioned between and communicating with said first and second cyclones for collecting some of said particulate matter removed by said second cyclone, said reinjection means directly connected to and communicating with said inlet hose for collecting said fluid drawn through said inlet hose; and a recycle hose extending between and connecting said reinjection means and said vacuum operated bagger assembly for injecting said collected particulate matter and said fluid into said first cyclone under negative pressure.

7. A vacuum loader in accordance with claim 6 wherein:

said filtering means comprises at least one filter selected from the group consisting of a tubular filter, a filter canister, a Hepa-type filter, and a box-type filter; and said container is selected from the group consisting of a flexible container and a rigid container, said flexible container comprising at least one bag selected from the group consisting of a plastic bag, a fabric bag, a rubber bag, a woven metal bag, and a paper bag, and said rigid container being selected from the group consisting of a metal drum, a fiberglass drum, an impact resistant plastic drum, a barrel, a vessel, a receptacle, and a bin.

8. A vacuum loader in accordance with claim 6 including means for cleaning said filter, said filter cleaning means being selected from the group consisting of a pulsed air injector, a vibrator, and a mechanical shaker.

9. A vacuum loader for removing asbestos, hazardous material, and other particulate matter, comprising:

a first stage bagger unit, comprising a vacuum operated bagger assembly having an upper bulk separation chamber with a roof providing a top and a lower asbestor dispensing chamber positioned substantially below said upper bulk separation chamber, said upper bulk separation chamber containing a centrifugal cyclone for making a gross cut and for separating and removing a substantial amount of particulates of asbestos from an influent dusty air stream laden with particulates of asbestos, said upper bulk separation chamber having a radial inlet port communicating with said cyclone for feeding said influent dusty air stream to said cyclone and having an outlet port positioned above said cyclone for discharging from said cyclone partially dedusted effluent air containing a lesser concentration of asbestos than said influent dusty air stream, said lower asbestos dispensing chamber comprising an elongated, substantially vertical, tubular vacuum cylinder providing an asbestos filling member extending downwardly below said cyclone for discharging particulates of asbestos removed by said cyclone, said vacuum cylinder having an upper inlet portion positioned adjacent said cyclone and having an open ended, lower discharge portion defining a downwardly facing discharge opening positioned substantially below said cyclone, said lower discharge portion having a seal gasket adjacent said discharge opening;

an inlet and recycle flexible hose operatively connected to and communicating with said inlet port for ingress of said influent dusty air stream into said cyclone of said vacuum operated bagger assembly;

an outlet discharge hose operatively connected to and communicating with said outlet port of said vacuum operated bagger assembly for egress of said partially dedusted effluent air from said upper chamber of said vacuum operated bagger assembly;

an elongated plastic bag positioned externally about and abutting against said tubular vacuum cylinder for receiving asbestos removed from said cyclone through said tubular vacuum cylinder;

an elastomeric retainer for securing said bag to said vacuum cylinder;

a base for stablizing and supporting said vacuum operated bagger assembly, said base being positoned upon the ground, floor, or pavement and having side members positioned laterally outwardly of said vacuum operated assembly and rearwardly inclined back members extending between and connecting said side members at a location spaced rearwardly of said vacuum operated bagger assembly;

an elongated upright arm assembly extending upwardly from said base, said arm assembly having a substantially vertical elongated arm fixedly secured to and extending above said base to a height above said vacuum cylinder, said vertical elongated arm being spaced rearwardly of said vacuum operated bagger assembly, said arm assembly having a substantially horizontal overhead arm cantilevered from and fixedly secured to an upper portion of said vertical elongated arm, said horizontal overhead arm being substantially smaller than said vertical elongated arm and extending forwardly of said vertical elongated arm to engage said upper chamber of said vacuum operated bagger assembly, and said arm assembly having a connector for securing said horizontal overhead arm to said upper chamber to elevate and space said vacuum operated bagger assembly above said base;

a moveable platen comprising a substantially horizontal, arcuate support platform with an elastomeric pad for abuttingly engaging and supporting the bottom of said bag or a drum containing said bag and having an upright curved arcuate back extending upwardly and rearwardly from said horizontal support platform for abuttingly engaging and supporting a side portion of said bag or said drum; and a pneumatic power assembly for moving said platen up and down comprising an upright elongated slotted cylindrical track mounted against said vertical elongated arm, a lift cylinder comprising a vertically reciprocating piston positioned in said track, a coupling member securely connecting said lift cylinder to said back of said platen, a compressed air tank connected to said lift cylinder, and a foot operated pedal valve operatively connected to said compressed air tank and said lift cylinder to lower said platen as said bag is being filled with said asbestos; and a trailerable separation and filtration unit spaced externally of and moveable towards and away from said first stage separate bagger unit, said separation and filtration unit comprising a second stage cyclone compartment having a cyclone inlet connected to said outlet discharge hose for receiving partially dedusted air with carryover asbestos from said upper bulk separation chamber of said bagger unit, said second stage cyclone compartment containing a second cyclone comprising a tangential cyclone spaced externally and laterally from said centrifugal cyclone in said upper bulk separation chamber of said bagger unit for further dedusting, separating, and removing a substantial amount of particulate of asbestos from said partially dedusted air from said first stage bagger unit;

a third stage filtration compartment positioned above and communicating with said second stage cyclone compartment, said third stage filtration compartment having a filtration chamber with a set of canisters containing tubular filters spaced along side of each other for partially filtering effluent air containing particulates of asbestos from said second stage cyclone compartment;

a fourth stage filtration compartment positioned downstream and spaced laterally from said third stage filtration compartment, said fourth stage filtration compartment located generally along side of said second stage cyclone compartment and said third stage filtration compartment, an intermediate conduit connectig said third stage filtration compartment and said fourth stage filtration compartment, and said third stage filtration compartment containing a Hepa-type filter for substantially filtering and removing the remaining particulates of asbestos from said partially filtered air from said third stage filtration compartment;

a dual valve reinjection compartment located below and communicating with said second stage cyclone compartment, said reinjection compartment having a reservoir tube comprising a collection chamber for receiving said asbestos removed by said tangential cyclone in said second stage cyclone compartment, said reinjection compartment having an outlet connected to said recycle hose for feeding said asbestos and influent dusty air laden with particulates of asbestos to said bagger unit, an inlet communicating with said reinjection compartment, a flexible influent hose connected to said inlet for feeding influent dusty air laden with particulates of asbestos to said reinjection compartment, said reinjection compartment having a first valve and a second valve, said first valve being normally open to permit passage of said asbestos removed from said tangential cyclone of said second stage cyclone compartment into said reinjection compartment and being closed to substantially maintain an air lock and block and prevent passage of said asbestos removed from said tangential cyclone of said second stage cyclone compartment into said reinjection compartment, and said second valve being normally closed after said bag is filled to substantially maintain said air lock and block and prevent passage of said influent dusty air and said collected asbestos in said reinjection compartment into said bagger unit and being periodically opened to permit ingress of said influent dusty air and said collected asbestos from said reinjection compartment into said bagger unit; and a vacuum pump selected from the group consisting of a pneumatic pump, air blower, fan, turbine, and compressor, communicating with said compartments and said bagger unit for drawing air containing said particulates of asbestos through said compartments and said bagger unit.

10. A vacuum loader in accordance with claim 9 wherein said third stage filtering compartment includes a set of injectors for periodically injecting intermittent blasts of air upon said tubular filters to help clean said tubular filters.

11. A vacuum loader in accordance with claim 9 wherein said vacuum cylinder defines a set of apertures for relieving negative pressure and suction when said bag is filled and removed.

12. A vacuum loader in accordance with claim 9 wherein said vacuum cylinder includes a transparent observation port and said platen includes a spacer safety flange extending downwardly from said support platform for elevating said support platform above the ground to substantially prevent said support platform from engaging and crushing the toes of the operator.

13. A vacuum loader in accordance with claim 9 wherein said vacuum operated bagger assembly has a deflector positioned in proximity to said vacuum cylinder for substantially preventing backflow and reentrainment of said asbestos.

14. A vacuum loader in accordance with claim 13 wherein said deflector comprises at least one baffle selected from the group consisting of a conical baffle, a spiral baffle, a helical baffle, and an annular baffle.

15. A vacuum loader in accordance with claim 13 wherein said deflector comprises a triangular baffle with an upwardly pointing apex positioned below said cyclone.

16. A process for removing asbestos or other material, comprising the steps of:

positioning a flexible bag container about the discharge opening of a vacuum cylinder comprising a filling member of a bagger unit;

supporting said bag with a platen comprising a moveable platform;

sealing said bag against said vacuum cylinder including elevating said platen to move said bag in sealing engagement with said vacuum cylinder;

drawing a dusty fluid laden with asbestos or other material into an inlet of said bagger unit; dispensing asbestos or other material into said bag through said filling member under suction and negative pressure; and lowering said platen after said asbestos or other material is dispensed into said bag; while concurrently abuttingly engaging and continuing to support said bag with said platen.

17. A process in accordance with claim 16 including:
ceasing said dispensing;
closing said bag;
severing said bag from said vacuum cylinder leaving a remnant retained to said vacuum cylinder;
removing said severed bag;
relieving at least some of said negative pressure; and
slipping a new bag over said remnant and a portion of said vacuum cylinder.

18. A process in accordance with claim 16 including substantially preventing upward backflow of said asbestos or other material from said bag to said filling member by baffling said asbestos or other material about said filling member.

19. A process in accordance with claim 16 including:
partially centrifugally separating and removing a substantial amount of asbestos or other material from said dusty fluid in a first cyclone in said bagger unit before said dispensing;
further centrifugally separating said partially centrifugally separated dusty fluid from said first cyclone in a second cyclone;
partially filtering said centrifugally separated dusty fluid from said second cyclone in a set of filter canisters above said second cyclone;
substantially removing the remaining asbestos or other material from said partially filtered dusty fluid by directing said partially filtered dusty fluid through a Hepa-type filter;
vacuuming said dusty fluid with an inlet hose;
collecting said centrifugally separated asbestos or other material from said second cyclone and said dusty fluid from said inlet hose in a reinjection compartment under negative pressure; and
feeding and recycling said collected asbestos or other material along with said fluid from said reinjection compartment to said first cyclone in said bagger unit.

* * * * *